Patented Mar. 21, 1944

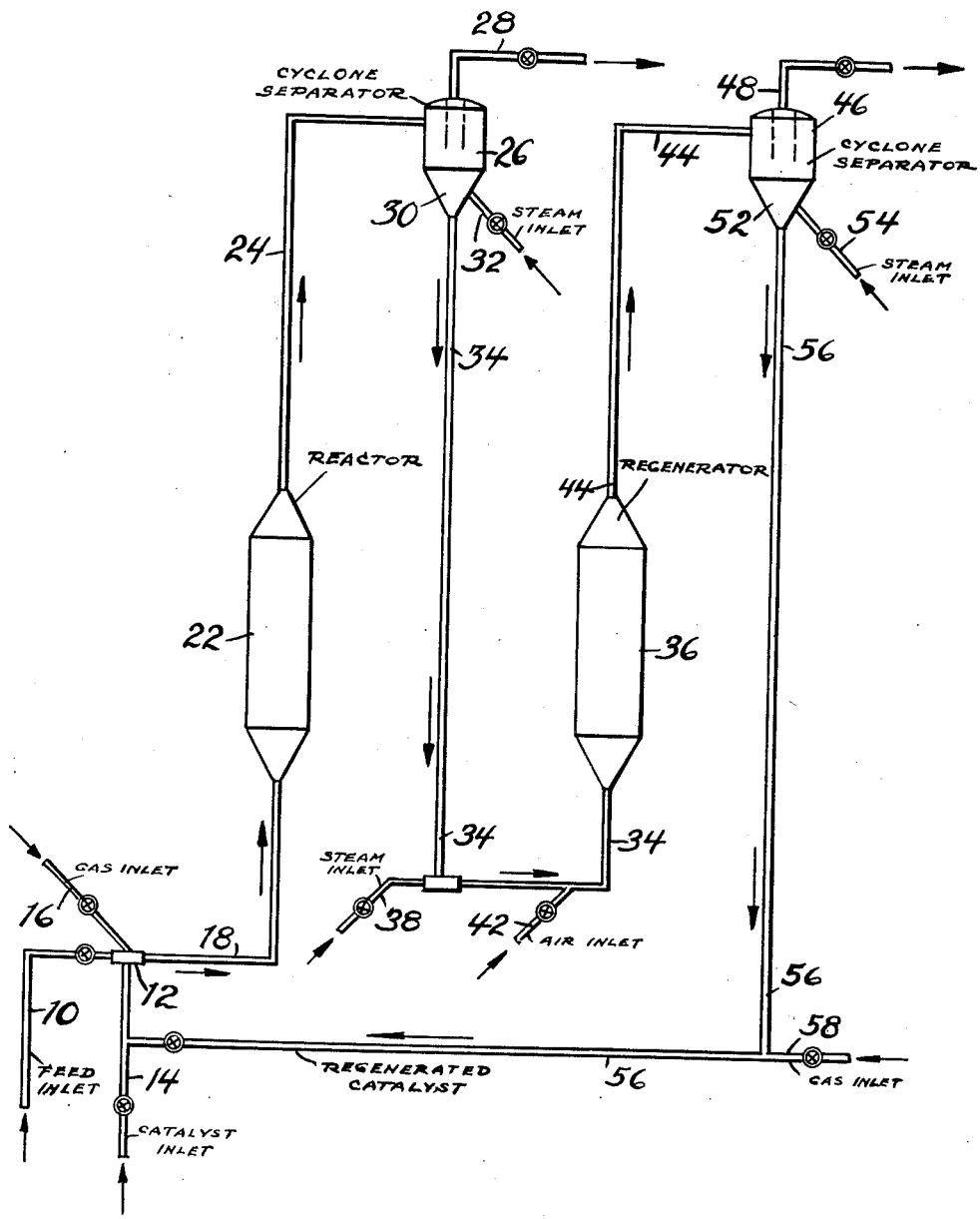

2,344,900

UNITED STATES PATENT OFFICE 2,344,900

TREATING HYDROCARBON FLUIDS

Edward D. Reeves, Cranford, and Philetus H. Holt, 2nd, Summit, N. J., assignors to Standard Oil Development Company, a corporation of Delaware Application April 2, 1942, Serial No. 437,314

4 Claims. (Cl. 196—52)

This invention relates to catalytic cracking of hydrocarbons using powdered catalyst.

In the catalytic conversion of hydrocarbons where finely divided or powdered catalyst is used and more particularly when finely divided or powdered catalyst is mixed with heated hydrocarbon vapors which are to be converted and the mixture passed through a reaction zone where the desired extent of conversion is effected, it is known that carbonaceous or organic matter is deposited on the catalyst particles during the conversion. The carbonaceous or organic deposit reduces the activity of the catalyst, but in some instances the activity is reduced only partially and the partly inactivated catalyst may be reused without regeneration until the activity of the catalyst is reduced to such an extent that regeneration of the catalyst is made necessary.

When catalytic cracking of higher boiling hydrocarbons to lower boiling hydrocarbons containing gasoline is carried out in the presence of finely divided or powdered catalysts, it is preferred to separate the products of reaction from the catalyst particles after the mixture of reaction products and catalyst leaves the reaction zone. In the preferred form powdered catalyst and hydrocarbon vapors and gases are passed as a mixture or suspension upwardly through an enlarged reaction vessel at a relatively low velocity and the catalyst particles remain in the reaction vessel for a relatively long time. While in the reaction zone the hydrocarbons are cracked to lower boiling hydrocarbons and the catalyst particles become coated with carbonaceous deposits. If too much carbonaceous material is deposited on the catalyst particles, this material may, upon reuse in the conversion zone, act auto-catalytically to form increasing amounts of carbonaceous deposits on the catalyst, thus incurring decreasing yields of gasoline from the cracking reaction.

It has been found in powdered catalyst cracking that the use of fresh catalyst or freshly regenerated catalyst results in excellent yields of gasoline with attendant good product distribution. By the term "good product distribution" is meant that the feed material for cracking, such as gas oil, is converted to form relatively large proportions of gasoline and cycle oil with minimum amounts of gas and coke or carbonaceous material. When using catalyst particles having too large amounts of carbonaceous deposits thereon the product distribution is very apt to be poor in that large amounts of gas and coke or carbonaceous materials may be formed due to the above-mentioned auto-catalytic action of the carbonaceous material on the catalyst.

Regenerated catalyst particles are relatively active and approach the activity of fresh unregenerated catalyst particles and this activity of the regenerated catalyst increases as the amount of carbonaceous material on the catalyst is reduced during regeneration. That is, completely regenerated catalyst particles having no remaining carbonaceous or organic deposits thereon are more active for cracking then partially regenerated catalyst particles containing some residual carbonaceous material.

While completely regenerated catalyst particles are more active than incompletely regenerated catalyst particles, it is necessary to consider the cost of regeneration. When regenerating catalyst particles containing about 4% carbonaceous material by weight and using air to burn off the carbonaceous material, the burning and removal of the carbonaceous material is exceedingly fast at the beginning of the regeneration and it is necessary to control the burning and regeneration to prevent too high temperatures which might deactivate the catalyst or decrease its activity. As the amount of carbonaceous material on the catalyst particles is reduced, however, it becomes increasingly difficult to remove the remaining carbonaceous material.

When there is only a fraction of a percent of carbonaceous material on the catalyst particles, the cost of regeneration to remove such a small amount is exceedingly high and the regeneration equipment becomes big and costly. Also the time of burning or removing fractions of a percent of carbonaceous material from the catalyst particles is longer than the time for burning larger amounts of carbonaceous material. The time of burning increases as the amount of carbonaceous material on the catalyst particles decreases.

From the above it will be seen that the amount of carbonaceous material on the regenerated catalyst particles should be maintained within certain limits and this invention relates to the catalytic cracking of hydrocarbons and regeneration of the catalyst particles whereby increased yields of gasoline and better product distribution are obtained without excessive cost of regeneration.

In the drawing there is shown one form of apparatus which may be used to carry out the process of this invention but it is to be understood that other forms of apparatus may be used.

Referring now to the drawing, the reference character 10 designates a line through which heated hydrocarbons are passed. The heated hydrocarbons are introduced into a mixing zone 12 where they are mixed with powdered or finely divided catalyst introduced through line 14 to form a suspension of the solid catalyst particles in the hydrocarbon vapors or gases. If desired, an inert or substantially inert gas, such as steam or other suitable gas, may be introduced into mixing zone 12 through line 16 to aid in dispersing the solid catalyst particles.

The mixture of catalyst particles and hydrocarbons at conversion temperature is passed through line 18 and into the lower portion of an enlarged, vertically arranged reaction zone or vessel 22 which is of a much larger diameter than the inlet pipe 18. Due to the enlarged diameter of the vessel 22 the velocity of the vapors and gases is decreased as they enter and pass upward through the vessel 22 with the result that there is some slippage between the vapors and gases and the solid catalyst particles and the concentration of the solid catalyst particles in the vapors is increased in the vessel 22 over that existing in inlet line 18. The velocity of the vapors and gases leaving the top of the reactor through line 24 is so maintained that the catalyst particles are fluidized and assume a level similar to a liquid.

However, the velocity of the mixture through the vessel 22 is high enough to prevent settling of catalyst particles on the floor of the vessel 22. The catalyst particles and hydrocarbon vapors and gases are in a turbulent condition in the reaction vessel and due to the intimate mixing, intimate contact is maintained between the catalyst particles and the hydrocarbons and a substantially uniform temperature is maintained in the mixture in vessel 22 to effect the desired extent of conversion. During the conversion the catalyst particles are coated with carbonaceous deposits and their activity is reduced.

The products of conversion and spent catalyst particles pass upwardly and leave the vessel 22 through line 24 and are introduced into separating means 26 for separating vaporous products of conversion from spent catalyst particles. The separating means is shown as a cyclone separator but other separating means may be used. Preferably a plurality of cyclones is used. In the separating means the vapors and gases pass overhead through line 28 to desired equipment for further treatment or separation such as fractionating equipment to separate desired lower boiling hydrocarbons.

The spent catalyst collects in the hopper 30 associated with the separating means 26 and a purging gas such as steam may be introduced into the hopper through line 32 to remove volatile hydrocarbons from the catalyst particles. The catalyst particles are withdrawn from the bottom of the hopper 30 and passed through line 34 in any suitable manner to the bottom portion of a vertically arranged regeneration vessel 36 which is of substantially the same construction as the reaction vessel 22. Steam introduced through line 38 may be used to carry the spent catalyst particles to the regeneration vessel 36.

Air or other suitable oxidizing agent is introduced into line 34 through line 42. The spent catalyst particles and oxidizing agent in admixture are passed upward through regenerator 36 and due to the enlarged diameter there is a slippage between the solid particles and the regeneration gases and the gases pass through the regenerator 36 at a faster rate than the solids. The solid catalyst particles and regeneration gases are maintained in a turbulent condition in the regenerator and intimate contact is obtained. Due to the mixing and movement of the catalyst particles and gases the temperature during regeneration is maintained substantially uniform and there is no overheating of portions of the catalyst particles. The catalyst particles are maintained in fluidized condition during regeneration.

From the regenerator 36 the regenerated catalyst particles and regeneration gases pass overhead through line 44 to another separating means 46 shown as a cyclone separator. Other separating means may be used. Preferably a plurality of cyclone separators is used and in addition an electric precipitator may be used to remove catalyst fines from the regeneration gases as a last stage of separation. The separated gases pass overhead through line 48. The regenerated catalyst particles are collected in hopper 52 into which steam or other suitable purging gas is introduced through line 54 to remove entrained air or oxidizing agent.

The regenerated catalyst particles are withdrawn from hopper 52 and passed through line 56 to catalyst inlet line 14 for reuse in the process. The catalyst particles are moved through line 56 in any suitable manner. Steam may be introduced into line 56 through line 58 for forming a suspension of the catalyst particles for return to the mixing zone 12. At the beginning of the operation fresh catalyst is introduced through line 14 but as the process is operated continuously regenerated catalyst is used and fresh catalyst may be added through line 14 to replenish catalyst lost in the process. For cooling or controlling the temperature of the regenerator 36, some of the regenerated catalyst particles from line 56 may be withdrawn, cooled and mixed with the catalyst particles which are being regenerated.

The invention will now be illustrated with a specific example involving catalytic cracking of gas oil to make gasoline. East Texas gas oil having an A. P. I. gravity of 33°, an initial boiling point of about 500° F., a 50% boiling point of about 600° F. is heated to about 900° F. to substantially completely vaporize it. Fresh catalyst, such as an acid treated bentonite clay in finely divided form is heated to about 950° F. The clay catalyst is of a size between about 200 and 400 mesh. About 3 parts of clay catalyst to one part of oil by weight is used.

The clay particles and oil vapors are passed to the reaction vessel 22 where they are intimately mixed due to the turbulent condition therein. The velocity of the vapors passing through reaction vessel 22 is about 1½ feet per second. The time of residence of the hydrocarbon vapors in reaction vessel 22 is about 12 seconds. The reaction products are separated from catalyst particles containing carbonaceous deposit. The catalyst particles contain about 1½% by weight of carbon. About 45% by volume conversion to gasoline was obtained.

The spent catalyst particles after being purged with steam were mixed with about 15 parts of air by weight per part of catalyst by weight and passed through the regeneration vessel 36, the velocity of the regenerating gas in vessel 36 being about 1½ feet per second and the temperature was maintained below about 1050° F. The time of residence of the catalyst particles in the regeneration zone was about 300 seconds and the catalyst particles leaving the regeneration zone contained about ½% of coke or carbonaceous material by weight.

If it were desired to remove substantially all of the remaining carbonaceous material, it would be necessary to pass the catalyst particles through another regeneration zone or maintain it in regeneration zone 36 for a longer period of time. In this way there would be a holdup of catalyst on the regeneration side and more catalyst and more regeneration equipment would be needed.

In general the rate of burning in regeneration operations is proportional to the amount of carbon in the regenerator or under fixed conditions to the percent of carbon on the catalyst. From the standpoint of ease of regeneration, therefore, it would be far easier to remove the carbon deposited on the catalyst during cracking (which amounts to 1% on catalyst) by letting the carbon on the catalyst build up so that the spent catalyst contains 3% carbon and is only regenerated to 2% carbon rather than regenerating from 1½% on spent catalyst down to ½% on regenerated catalyst. The rate of regeneration at the higher level would be four times that at the lower level so that the regenerating equipment would be only one fourth the size and consequently cheaper. However, the presence of carbon on the catalyst exerts an auto-catalytic effect and forms more carbonaceous material at a faster rate than fresh catalyst and also forms more gas and less cycle oil so that lower conversion and poorer product distribution are obtained.

The following data obtained by cracking an East Texas gas oil with acid treated bentonite clay catalyst particles between about 200 to 400 mesh show the effect of coke on catalyst on conversion:

| Weight percent coke on regenerated catalyst | Conversion to 10 lbs. R. V. P. gasoline | Weight percent based on feed, of coke formed during cracking | Normal coke at conversion obtained |
|---|---|---|---|
| 0.5 | 50 | 4.1 | 4.1 |
| 1.0 | 46 | 3.7 | 3.1 |
| 2.0 | 40 | 4.2 | 2.0 |
| 3.0 | 35.2 | 4.9 | 1.4 |
| 4.0 | 31.8 | 6.1 | 1.1 |

From the above it will be seen that the conversion should be stopped when the weight percent of coke on the catalyst reaches about 2% as above this figure poorer product distribution is obtained, that is, less conversion to gasoline and more coke is formed. The coke or carbonaceous material acts as a catalyst to make more coke or carbonaceous material, more gas and less gasoline than a catalyst containing only a small amount of carbonaceous material and therefore it is best practice to maintain the amount of carbonaceous deposits on the catalyst low during conversion.

From the above data it will be seen that the amount of coke or carbonaceous material on the regenerated catalyst should preferably be between about 0.5% and 1.0% by weight on the catalyst particles to obtain the best product distribution with largest conversion to gasoline and least formation of coke on feed oil without excessive regeneration.

The last heading in the above table of data entitled "Normal coke at conversion obtained" is made up from correlations to show how much coke would be formed if catalyst regenerated to 0.5% carbon were used to obtain the conversions given. Using this catalyst, less coke is formed at a given conversion level.

From the conversion data and regeneration data it has been found that during conversion the amount of coke or carbonaceous material deposited on the catalyst during the conversion should not exceed about 2% by weight on the powdered catalyst. That is, if starting with regenerated catalyst containing 0.5% by weight of coke, the conversion should be stopped when the catalyst contains 2.5% coke by weight. Preferably, however, the total coke on the catalyst particles after a conversion operation should in most cases be not above about 2% by weight.

For regenerating spent powdered catalyst particles and using 10% excess air as a regenerating medium at atmospheric pressure the following data have been obtained:

|  | Percent coke burned from catalyst | | |
|---|---|---|---|
|  | 90 | 75 | 60 |
| Temperature °F | 1,000  900 | 1,000  900 | 1,000  900 |
| Time minutes | 16.5  58 | 6.5  17.5 | 3.5  10 |

The data show that, for example, to remove 75% of the coke or carbonaceous material from the catalyst at a regeneration temperature of 1000° F., it takes 6.5 minutes whereas at 900° F., it takes 17.5 minutes. At higher regeneration temperatures shorter times are used. For example, with a catalyst having 2% coke thereon it will take 6.5 minutes at 1000° F., to remove 75% of the coke and there will be 0.5% coke left on the catalyst. To remove 75% of the remaining 0.5% of coke would take 6.5 minutes, etc. The figures at 90% and 60% above given will be clear from the above explanation.

It is preferred to regenerate the powdered catalyst to remove 60% to 80% of the coke therefrom but in some cases for removing large amounts of coke the range may be extended to 90%.

For example, starting with powdered regenerated catalyst having about 0.8% by weight of coke and using it for converting hydrocarbons until the total coke on the catalyst is 2.0% by weight, it should then be purged and regenerated. About 60% by weight of the coke is removed at 1000° F. in about 3.5 minutes and that leaves about 0.8% by weight of coke on the powdered catalyst which is the same as was on the starting catalyst.

In another example starting with a powdered catalyst having about 0.5% by weight of coke thereon, the catalyst is used in a hydrocarbon conversion and about 1% of coke is added to make a total of 1.5% coke by weight on the catalyst. About 67% of the coke is removed and this leaves about 0.5% of coke on the catalyst. After repeated conversion and regenerations the amount of coke on the regenerated catalyst remains at 0.5% by weight.

If it is desired to remove 75% by weight of the deposited coke, starting with a powdered catalyst having about 0.5% coke by weight and adding 1.5% by weight during conversion, the catalyst after purging is regenerated at about 1000° F. and after repeated conversions and regenerations, the coke on the regenerated catalyst at the beginning of each conversion operation remains at 0.5% by weight.

Preferably, the 60% regeneration is used where the total coke on the catalyst to be regenerated is below about 1.5% by weight and the 75% regeneration is used where the total coke on the catalyst to be regenerated is about 2% by weight and the amount of coke laid down during conversion is 1.5% or more by weight. The 90% regeneration is used for higher cokes as for example in those cases where the total coke on the catalyst is about 3% by weight and in these cases the coke is reduced to about 0.3% by weight of the catalyst.

According to this invention, when cracking gas oils or similar oil stocks to make the maximum amount of high quality gasoline in a continuous process the limits of the amounts of coke or carbonaceous material on the catalyst particles in finely divided form are preferably between about 0.5% and 2.0% by weight on the catalyst. However, in some cases the lower limit following regeneration may extend to 0.2% and the upper limit following cracking may extend to about 3% by weight of coke on the catalyst. During conversion, preferably not more than about 2% by weight of coke on the catalyst should be deposited.

In regenerating it is not economical in most cases to reduce the carbonaceous deposit below about 0.5% by weight on the catalyst. In cracking it is not economical to start with catalyst particles having more than about 1.0% by weight of residual coke or carbonaceous material and it is not economical to use a catalyst having more than about 3% of coke or carbonaceous deposit thereon for the reason that reduced yields of gasoline are obtained and poor product distribution with increased yields of gas and carbonaceous material are obtained.

Instead of removing catalyst particles overhead from the conversion zone and regeneration zone, they may be withdrawn from the bottom of each zone in a dense fluidized condition.

With different catalysts and different feed stocks the limits of the amounts of carbonaceous material may vary somewhat from the limits above given for a specific gas oil and catalyst but the invention will be applicable thereto because of the expense of regenerating to substantially zero residual carbonaceous material and because of poor yields and product distribution when cracking with a catalyst having too much residual carbonaceous material thereon.

What is claimed is:

1. In a process of converting hydrocarbons in the presence of finely divided catalyst wherein heated hydrocarbon vapors and gases are mixed with finely divided catalyst particles and the mixture is passed through a conversion zone to effect the desired conversion during which the catalyst particles become coated with coke or carbonaceous deposits and the catalyst particles are separated from the conversion products and regenerated by burning with air, the steps of limiting the regeneration to remove 60% to 90% of the carbonaceous deposits by weight and limiting the amount of carbonaceous material deposited on the catalyst particles during conversion of hydrocarbons in said conversion zone to about 1% and not more than 2% by weight on the catalyst.

2. A process for converting hydrocarbons which comprises mixing heated hydrocarbon vapors with finely divided catalyst particles, the catalyst particles having a fraction of a percent by weight of carbonaceous deposit thereon between about 0.5% and 1% from a previous regeneration operation, passing the suspension through a conversion zone to effect the desired extent of conversion, during which the catalyst particles have deposited thereon about 1% to 2% of carbonaceous material by weight on the catalyst and the catalyst particles lose part of their effectiveness as a catalyst, and separating the catalyst particles from products of conversion.

3. A process for converting hydrocarbons which comprises mixing heated hydrocarbon vapors with finely divided catalyst particles, the catalyst particles having a fraction of a percent by weight of carbonaceous deposit thereon but not more than about 1% of carbonaceous deposit from a previous regeneration operation, passing the mixture through a conversion zone to effect the desired extent of conversion of hydrocarbons, during which the catalyst particles have deposited thereon about 1% to 2% of carbonaceous material by weight on the catalyst and the catalyst particles become at least partially spent, separating the catalyst particles from products of conversion, regenerating the separated catalyst particles by burning with air in a regeneration zone and limiting the regeneration so that the catalyst particles are not completely regenerated and there is between about 0.5% and about 1 percent by weight of residual carbonaceous material.

4. A process for catalytic cracking of higher boiling hydrocarbons to form lower boiling hydrocarbons suitable for use as motor fuel which comprises passing a mixture of heated hydrocarbon vapors and powdered catalyst through a conversion zone during which time the catalyst particles become coated with carbonaceous deposits which decrease the effectiveness of the catalyst particles for production of motor fuel constituents, limiting the time the catalyst particles are in said conversion zone so that about 1% but not more than about 2% of carbonaceous deposits by weight is deposited on the catalyst particles, separating the coated catalyst particles from conversion products, separating motor fuel constituents from the conversion products, regenerating the separated coated catalyst particles by burning off in a regeneration zone a large percentage of the deposited carbonaceous material, limiting the time the catalyst particles are within said regeneration zone so that the carbonaceous material is reduced to about 0.5% to 1% by weight of the catalyst particles and reusing the regenerated catalyst particles in another conversion operation.

EDWARD D. REEVES.
PHILETUS H. HOLT, 2ND.